United States Patent [19]

Brunken

[11] Patent Number: 5,305,942
[45] Date of Patent: Apr. 26, 1994

[54] METHOD FOR SEALING THERMAL PROCESSING APPARATUS

[75] Inventor: Ronald D. Brunken, Torrance, Calif.

[73] Assignee: Rockwell International Corporation, Seal Beach, Calif.

[21] Appl. No.: 52,983

[22] Filed: Apr. 27, 1993

[51] Int. Cl.$^5$ .............................................. B23K 31/02
[52] U.S. Cl. ................................. 228/173.4; 228/245; 29/515
[58] Field of Search ..................... 228/173.4, 184, 245; 29/508, 515

[56] References Cited

U.S. PATENT DOCUMENTS 2,469,975  5/1949  McCloy ........................... 228/173.4
4,204,378  5/1980  Thompson ....................... 228/173.4

FOREIGN PATENT DOCUMENTS 284063  3/1931  Italy ..................................... 29/515

Primary Examiner—Paula A. Bradley
Assistant Examiner—Jeffrey T. Knapp
Attorney, Agent, or Firm—Terrell P. Lewis; Charles T. Silberberg

[57] ABSTRACT

A novel method for sealing the end of tubing connected to and extending from a container housing workpieces to be thermally processed using mechanical as well as thermal means. The invention also contemplates a novel tubing member for connection to such a container, where the sealing material is disposed within the tubing member prior to insertion of the tubing into the container. After fixing the tubing in the container, a plurality of locations along the length of the tubing are identified where mechanical closure of the tubing is effected. Then, the tubing is heated to a temperature sufficiently high to melt the contained sealing material at the crushed locations, such that a metallurgical seal is formed inside the tubing at the crushed locations.

6 Claims, 1 Drawing Sheet

METHOD FOR SEALING THERMAL PROCESSING APPARATUS

BACKGROUND OF THE INVENTION

Field of the Invention

The present invention relates to processes and apparatus for sealing containers, and more particularly to a method and apparatus for tightly sealing metal evacuation tubes of a container using brazing techniques.

Background of the Invention

There are a variety of applications in which metal tubing is used where it must be sealed against the atmosphere. In such cases, the tubing is usually attached to a container which either has been evacuated and thus is at a pressure lower than the environment which contains the container, or has been filled with gas or other fluid under a pressure higher than the environment which contains the container.

One example of an area of technology in which it is desirable to effect the sealing of tubing is where a controlled environment is necessary, as in the context of diffusion bonding a workpiece made of a reactive metal, such as titanium or its alloys. The controlled environment is typically attained through the use of a metallic envelope or container known as a "retort", which envelopes a workpiece that has been prepared for diffusion bonding. The retort comprises upper and lower metal members which are to be sealed at edge regions about the workpiece. Typically, tubing is connected to the chamber formed by the upper and lower metal members of the retort within which the workpiece is contained. After sealing the edge regions of the chamber, the fluid in the chamber is evacuated by vacuum pump means coupled to the chamber via the tubing. It is this tubing which must also be sealed after the chamber has been evacuated.

Another situation where sealing of tubing is desirable involves the filling of a container with a pressurized fluid or with a fluid which develops a pressure greater than the ambient pressure upon a change in ambient temperature. Following the filling of the container, it is necessary to hermetically seal the tubing used to deliver the fluid.

The principal problem confronted when attempting to isolate either a pressurized chamber or an evacuated chamber from the environment is the attainment of a complete seal of the tubing following manipulation of the fluid contents in the chamber.

Several techniques for sealing tubing are known; mechanical deformation or crimping; welding; and brazing. In the case of mechanical deformation, the tubing is first heated and then caused to collapse via a crushing force applied using a mechanical tool. In welding, two pieces of metal to be joined are disposed atop one another and melted and, upon cooling, the two pieces become one piece. In brazing, a solder alloy is melted and is caused to flow onto the surfaces of the two metal members to be joined, and after the alloy cools, the two pieces are joined together.

Each of these techniques has proven undesirable and there exists a great need for a new and more effective method for sealing tubing connected to the containers.

Welding is undesirable insofar as the equipment necessary to effect the weld is unwieldy and not portable so that its accessibility is not assured. Moreover, welding requires the melting of the metal members to be joined, and in certain applications, the level of heat developed can be destructive of the contents of the containers or the containers themselves.

Likewise, soldering is undesirable for closing the ends of tubing. In the case of a chamber having a higher or lower internal pressure than the ambient, after heating, then pinching the tubing, and then dipping the pinched tubing end in solder, the solder "plug" has been forced out of its place of securement by the difference between the chamber pressure and the ambient pressure, thereby destroying the integrity of the seal. And where the chamber is one in which the fluid has been evacuated, the resulting seal is rendered ineffective when the container and connected tubing are subjected to subsequent thermal treatment, as for example the heating associated with a diffusion bonding treatment, causing remelting and loss of the solder "plug" as it reaches its melting point.

On the other hand, with mechanical crimping techniques where the tubing has simply been collapsed, with or without heating, the resulting seal has been found to withstand limited pressures within the tubing.

OBJECTS OF THE INVENTION

It is therefore an object of the present invention to provide a novel method for sealing tubing connected to containers housing workpieces to be thermally processed, while overcoming all the disadvantages and drawbacks of the currently known sealing methods.

Another object of the present invention is to provide a method for closing the end of tubing extending from a container where the closure is effected by mechanical as well as thermal steps.

Another object is to provide a novel tubing member for connection to such a container, where the sealing material is disposed within the tubing member prior to insertion of the latter in the former.

These and other objects are accomplished by first connecting tubing to appropriate locations at the periphery of a container housing a workpiece, the tubing having sealing material disposed within. Next, the tubing is mechanically closed at a plurality of locations along its length outside the container. Then, the tubing is heated to a temperature sufficiently high to melt the tubing-contained sealing material, whereby a metallurgical seal is formed inside the tubing. A preferred sealing material is brazing alloy which may take the form of a cylindrical tube or, sleeve inserted in the tubing.

DETAILED DESCRIPTION OF THE INVENTION

Figure 1:
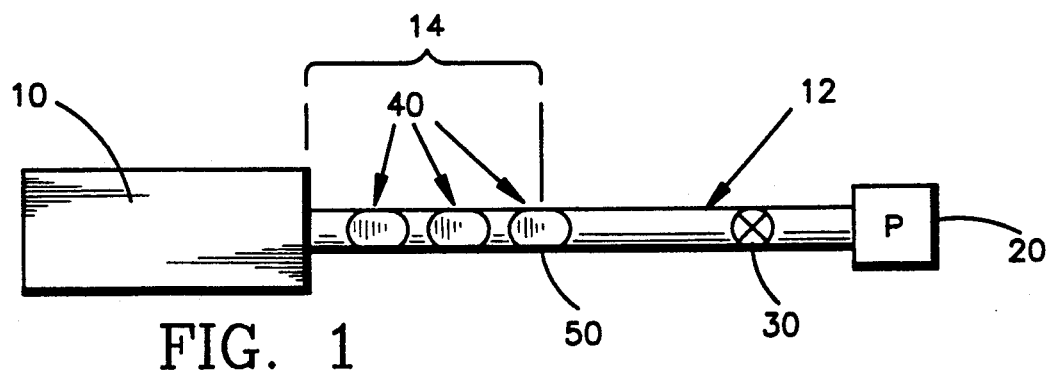
FIG. 1 illustrates one example of a container and tubing combination of the type currently in use today.

Referring now to FIG. 1, there is shown a container or retort 10 of the type used in industry today in combination with metal tubing 12 for fluidly interconnecting the container with a pump 20. The pump 20 may be of the type used to evacuate fluid from within the container, or pump 20 may be of the type used to deliver pressurized fluid to the container. A shut-off valve 30 preferably is disposed within the tubing and is actuatable to close the tubing to prevent leaking of fluid into or out of the container. A region 14 of the tubing 12 in proximity to the container is heated, as for example by passing the flame of a gas torch back and forth across the region.

Next, a plurality of crimps 40 are mechanically formed in the heated region 14 of tubing. Thereafter, the tubing is cut (as at location 50) and the so-formed end thereof welded closed.

The present invention, as shown in FIGS. 2-6, contemplates closing the end of metal tubing 112 extending from a container 110 by inserting a tubular sleeve or member 118 (see FIGS. 3 and 4) of brazing alloy within the metal tubing prior to the heating and crimping of the tubing.

In carrying out the process for evacuating or pressurizing the container and sealing the tubing leading from the container, the tubular member 118 of brazing alloy is inserted within the tubing 112 in a tightly concentric fit. Fluid is delivered to or removed from the container 110 using a pump 120. The shut-off valve 130 located in the tubing 112 is then actuated to prevent leakage of fluid to or from the container.

Next, crimps 140 are mechanically formed in the region 114 of the tubing 112. Region 114 spans a length of tubing which includes the alloy tubular member 118. The crimped region 114 is then heated to melt the braze alloy, and thereafter subjected to cooling (either active, as via forced air, or passive). As a result of this process, a metallurgical brazed joint is formed. Next, the tubing is cut at a crimp which lies outside the region 114 and which does not contain braze alloy (see crimp 150 in FIG. 2). The brazed joints at the crimps 140 provide a secure tubing seal following cutting of the tubing at crimp 150, and especially during subsequent thermal processing. Examples of such further processing include diffusion bonding, hot isostatic pressing, etc.

The braze alloy used in this process is chosen to be metallurgically compatible with the material of the tubing and all subsequent processing of the retort (e.g., elevated temperature, exposure, etc.).

Following crimping of the region 114 and contained tubular member 118, heating of the region to melt the braze alloy may be carried out using a gas torch, an induction heating coil, or any other suitable heating medium.

Figure 3:
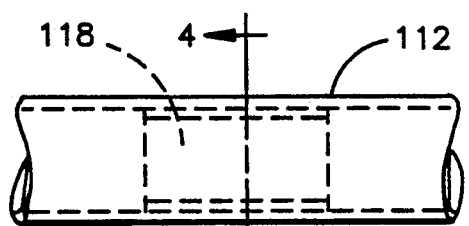
FIG. 3 is a side view of a section of tubing of the type contemplated in the combination of FIG. 2, prior to crimping of the tubing.
Figure 4:
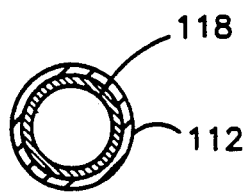
FIG. 4 is a cross-sectional view of the tubing shown in FIG. 3.

The present invention contemplates the use of brazing alloy in a cylindrical arrangement, as shown in phantom in FIG. 3 and in FIG. 4 at 118, and may be embodied as a ring or sleeve, a coating, a powder or a film secured or disposed on one inner surface of the tubing. The preferred configuration of the alloy 118 is as a ring or sleeve, as shown in FIG. 4. The present invention contemplates providing the brazing alloy as a solid body, but such a configuration is not shown here.

Figure 2:
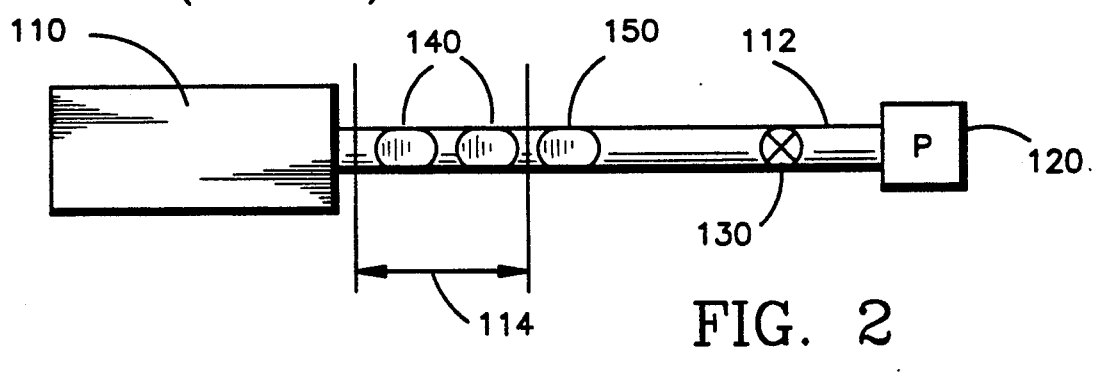
FIG. 2 shows a container and tubing combination of the type contemplated by the present invention.
Figure 5:
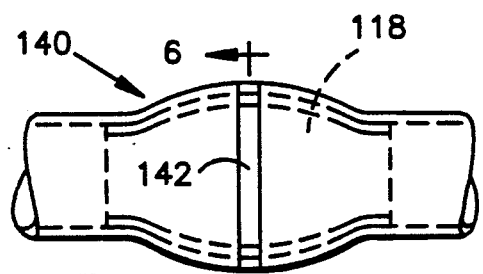
FIG. 5 is a side view of a section of tubing of the type contemplated in the combination of FIG. 2, after the tubing has been crimped and sealed.
Figure 6:
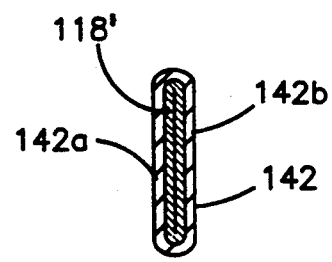
FIG. 6 is a cross-sectional view of the tubing shown in FIG. 5.

FIGS. 5 and 6 illustrate the tubing 112 of FIG. 2 in the crimping region 114 where the sleeve of brazing alloy is located. As shown in FIG. 5, formation of the crimp 142 in the tubing 112 in turn creates opposed substantially flattened tubing "inner wall surfaces" 142a and 142b, each of which respectively carries an arrangement of the brazing alloy 118, now disposed in juxtaposed, touching relationship, such that when the brazing alloy is raised to a brazing temperature, the alloy melts and facilitates the creation of a metallurgical brazed joint.

While certain representative embodiments and details have been shown for the purpose of illustrating the invention, it will be apparent to those skilled in this art that various changes and modifications may be made therein without departing from the spirit or scope of this invention.

What we claim is:

1. A method for sealing the interior of a container from the environment, comprising the steps of:
   (1) coupling tubing to said container;
   (2) providing a predetermined amount of brazing material inside a length of said tubing;
   (3) forming a plurality of crimps in a region of the tubing, said region encompassing said length; and
   (4) heating said region of said tubing to a brazing material melting point, whereby said brazing material melts and flows to form a metallurgical weld at each said crimp.

2. The method of claim 1, wherein said brazing material is provided concentrically inside said length of tubing.

3. The method of claim 1, wherein said brazing material has the form of a cylindrical member, and said step of providing a predetermined amount of brazing material includes inserting a tightly fitting cylindrical member of said brazing material within said tubing.

4. The method of claim 3, wherein said cylindrical member is solid.

5. The method of claim 3, wherein said cylindrical member is hollow.

6. The method of claim 1, wherein said tubing is coupled between said container and an evacuation pump, and further including the step of actuating the pump to effect evacuation of said container, said actuating step being carried out before said step of forming a plurality of crimps in said tubing.

* * * * *